United States Patent
Kong et al.

(10) Patent No.: US 9,005,836 B2
(45) Date of Patent: Apr. 14, 2015

(54) SOLID OXIDE FUEL CELL STACK

(75) Inventors: Sang-Jun Kong, Yongin-si (KR); Duk Hyoung Yoon, Yongin-si (KR); Tae-Ho Kwon, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 384 days.

(21) Appl. No.: 13/548,617

(22) Filed: Jul. 13, 2012

(65) Prior Publication Data

US 2013/0095396 A1 Apr. 18, 2013

(30) Foreign Application Priority Data

Oct. 12, 2011 (KR) .......................... 10-2011-0104125

(51) Int. Cl.
*H01M 8/24* (2006.01)
*H01M 8/12* (2006.01)
*H01M 8/04* (2006.01)

(52) U.S. Cl.
CPC .......... *H01M 8/04201* (2013.01); *H01M 8/243* (2013.01); *H01M 8/2485* (2013.01); *H01M 8/04007* (2013.01); *Y02E 60/50* (2013.01)

(58) Field of Classification Search
None
See application file for complete search history.

(56) References Cited

U.S. PATENT DOCUMENTS

| 7,855,004 | B2 | 12/2010 | Iyengar et al. |
| 2005/0123808 | A1* | 6/2005 | Draper et al. .................... 429/13 |
| 2011/0086293 | A1* | 4/2011 | Kong et al. .................... 429/513 |
| 2012/0129062 | A1* | 5/2012 | Fernandes et al. ............. 429/415 |

FOREIGN PATENT DOCUMENTS

| JP | 2009-218110 A | 9/2009 |
| KR | 2006-0019998 A | 3/2006 |
| KR | 2008-0053402 A | 6/2008 |

* cited by examiner

*Primary Examiner* — Jonathan Crepeau
(74) *Attorney, Agent, or Firm* — Knobbe, Martens, Olson & Bear LLP

(57) ABSTRACT

A solid oxide fuel cell (SOFC) stack is disclosed. The SOFC may include an oxidizing agent flow path fluidly connecting a first oxidizing agent chamber and a second oxidizing agent chamber. The first oxidizing agent chamber may include an oxidizing agent supply pipe through which an oxidizing agent is flowed from an outside thereof. The second oxidizing agent chamber may perform a reduction reaction on the oxidizing agent received from the first oxidizing agent chamber. In operation, a fluid flows between the first and second oxidizing agent chambers, and may be provided to an outside of the second oxidizing agent chamber. Further, the structure of the flow path may allow heat to be conducted from the second oxidizing agent chamber.

10 Claims, 6 Drawing Sheets

SOLID OXIDE FUEL CELL STACK

CROSS-REFERENCE TO RELATED APPLICATIONS

This application claims priority to and the benefit of Korean Patent Application No. 10-2011-0104125, filed on Oct. 12, 2011, in the Korean Intellectual Property Office, the entire content of which is incorporated herein by reference.

BACKGROUND

1. Field

The present disclosure relates to a solid oxide fuel cell (SOFC) stack, and more particularly, to the structure of the SOFC and a stack modularization.

2. Description of the Related Technology

Fuel cells may be classified depending upon electrolyte type. Since the fuel cells have various power ranges, a suitable fuel cell can be selected according to its proposed use. Among solid oxide fuel cells (SOFCs), it is relatively easy to control electrolyte position without risk of exhausting the electrolyte. Further, since the SOFCs resist corrosion, SOFCs may have extended lifetimes. For these reasons, SOFCs are seriously considered for distributed generation, commerce and domestic use.

Portions of a SOFC stack include a cylindrical SOFC, a fuel, and an oxidizing agent. Hence, a fuel supply pipe, a fuel (for unreacted fuel) discharge pipe, an oxidizing agent supply pipe and an oxidizing agent discharge pipe are also positioned within the fuel cell stack. Further, fuel cell stacks can be formed as part of a fuel cell module having piping equipment for supplying and discharging fuel and oxidizing agent as simply as possible. The particular structure the supply and discharge portions of the fuel cell module (for the fuel and the oxidizing agent) are important.

SUMMARY OF CERTAIN INVENTIVE ASPECTS

In one aspect, a fuel cell stack having a means for preheating an oxidizing agent supplied thereto is provided.

In another aspect, a fuel cell stack is provided having supply and discharge pipes configured for a fuel and an oxidizing agent, provided in a common direction for configuration of an efficient fuel cell module.

In another aspect, a fuel cell stack is provided having a configuration in which supply and discharge pipes configured for transporting a fuel and an oxidizing agent are provided in a common direction and in operation of the stack the fuel and oxidizing agent can be uniformly supplied in the inside of the fuel cell stack.

In another aspect, a fuel cell stack is provided capable of improving the efficiency of a fuel cell itself by enabling efficient circulation of air.

In another aspect, a fuel cell module is provided having supply and discharge pipes configured for transporting a fuel and an oxidizing agent are provided in a common direction, thus simplifying the structure of the fuel cell module for supply and discharge of the fuel and the oxidizing agent and improving fuel cell module efficiency.

In another aspect, a fuel cell stack is provided and configured such that during operation of the fuel cell stack the oxidizing agent is preheated before participating in an electromagnetic reaction of the fuel cell stack, and efficiency of the fuel cell stack is improved.

In another aspect, the oxidizing agent and the fuel are supplied to one side of a fuel cell stack, and in operation of the fuel cell stack the oxidizing agent and the fuel are uniformly supplied to the inside of the fuel cell stack, and variation in electricity generation performance of the fuel cell stack is reduced.

In another aspect, a fuel cell stack includes, for example, an oxidizing agent supply pipe configured to allow an oxidizing agent to flow from outside the fuel cell stack into a first oxidizing agent chamber, a second oxidizing agent chamber configured to perform a reduction reaction on the oxidizing agent, and an oxidizing agent flow path fluidly connecting the first and second oxidizing agent chambers, the oxidizing agent flow path having an opening to an outside of the second oxidizing agent chamber, the opening positioned and configured to conduct heat away from the second oxidizing agent chamber.

In some embodiments, the oxidizing agent flow path is positioned adjacent to the oxidizing agent supply pipe. In some embodiments, a heat conductive member is positioned between the oxidizing agent flow path and the second oxidizing agent chamber. In some embodiments, an oxidizing agent discharge pipe and the oxidizing agent supply pipe are formed on the same surface.

In some embodiments, the fuel cell stack further includes a first fuel chamber having a fuel supply pipe through which a fuel is supplied, a second fuel chamber fluidly connected to a fuel discharge pipe through which unreacted fuel is discharged to an outside thereof, a flow pipe having one end fluidly connected to the first fuel chamber and the other end opened, and a unit cell surrounding the flow pipe to form a flow path between the unit cell and the flow pipe, the unit cell having one end sealed and the other end fluidly connected to the second fuel chamber. In some embodiments, the fuel discharge pipe and the fuel supply pipe are formed on the same surface. In some embodiments, the fuel supply pipe, the fuel discharge pipe, the oxidizing agent supply pipe and the oxidizing agent discharge pipe are provided in the same side.

In some embodiments, the fuel cell stack further includes a lower chamber fluidly connecting the oxidizing agent flow path and the second oxidizing agent chamber. In some embodiments, a distribution portion is positioned over the lower chamber, the distribution portion configured for uniformly supplying the oxidizing agent from the lower chamber into the second oxidizing agent chamber. In some embodiments, the distribution portion is formed with a two-step plate having a plurality of holes formed therein.

In some embodiments, the fuel cell stack further includes an oxidizing agent collection chamber fluidly connected to each of the second oxidizing agent chamber and the oxidizing agent discharge pipe. In some embodiments, the fuel cell stack further includes a plate having a plurality of collection holes fluidly connecting the oxidizing agent collection chamber and the second oxidizing agent chamber. In some embodiments, the oxidizing agent collection chamber is positioned at an upper end of the second oxidizing agent chamber. In some embodiments, the plurality of collection holes is formed at a circumference of the upper end of the second oxidizing agent chamber.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail

DETAILED DESCRIPTION OF CERTAIN INVENTIVE EMBODIMENTS

Figure 1:
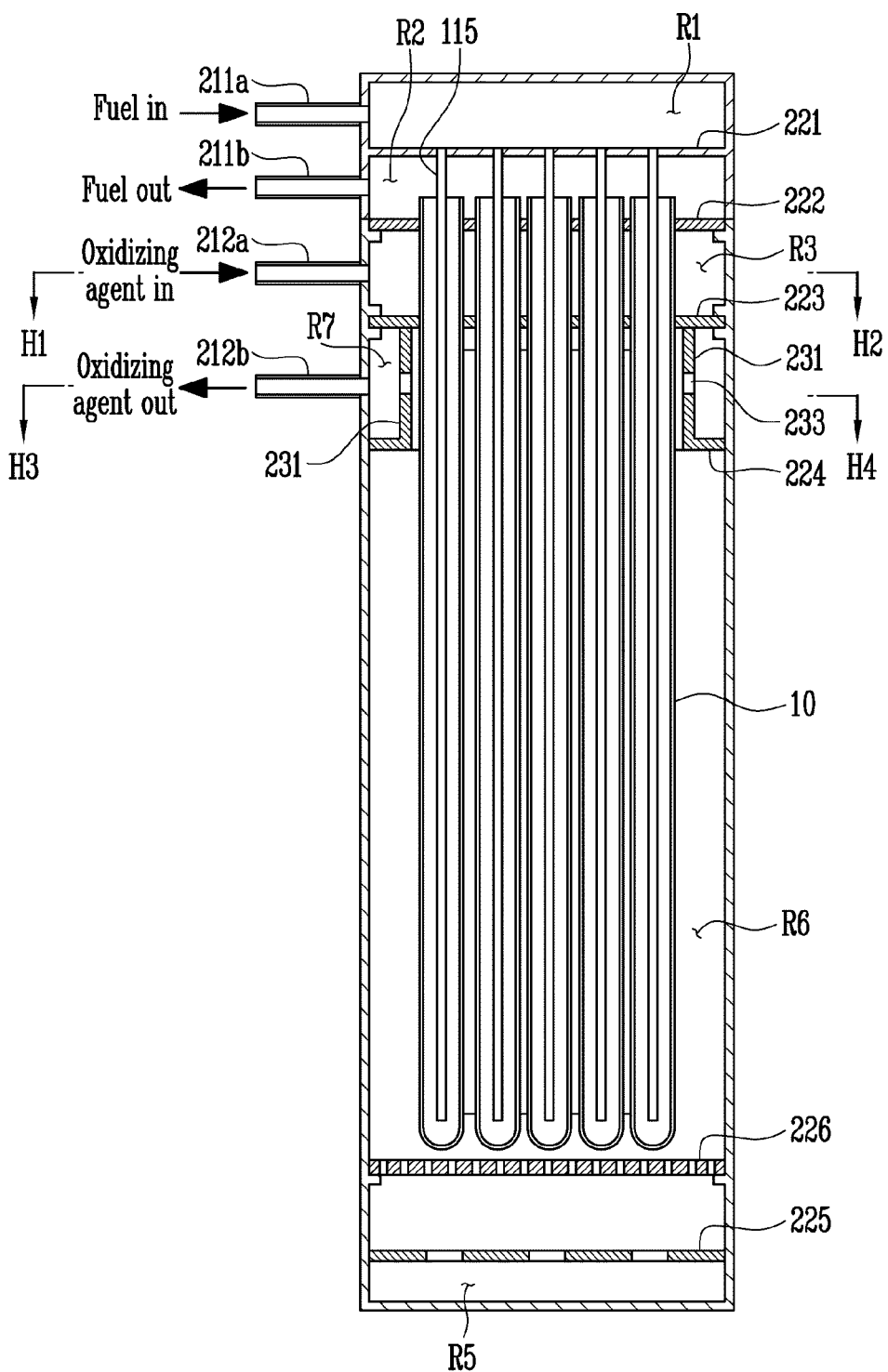
FIG. 1 is a longitudinal sectional view showing a fuel cell stack according to an embodiment of the present disclosure.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Hereinafter, unreacted fuel refers to gas (off-gas) exhausted in the state that the gas contains a large amount of hydrogen after a reaction is finished in an inside of a fuel cell stack.

A general fuel cell may include a fuel converter (a reformer and a reactor) configured for reforming and supplying fuel and a fuel cell module. Here, the fuel cell module refers to an assembly including a fuel cell stack configured for converting chemical energy into electric energy and thermal energy using an electrochemical method. That is, the fuel cell module may include a fuel cell stack, a piping system through which fuel, oxidant, coolant and emissions are moved, a wire through which electricity produced by the stack is conducted, a part configured for controlling or monitoring the stack, and a part for taking measures when an abnormal state of the stack occurs. An aspect of the present disclosure relates to a fuel cell stack in which electricity is generated by an electromagnetic reaction using a plurality of unit cells as one unit. Hereinafter, embodiments of the present disclosure will be described in detail.

Figure 2:
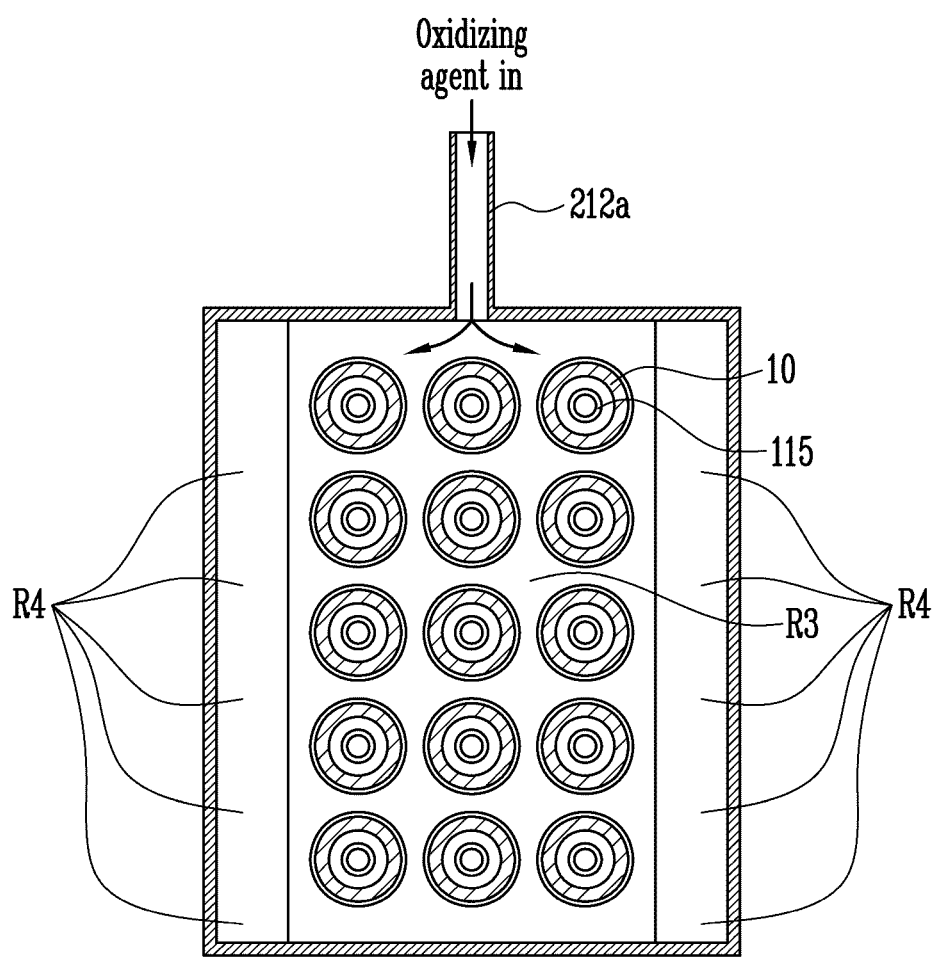
FIG. 2 is a cross-sectional view taken along line H1-H2 of the fuel cell stack in FIG. 1.

Unit cells 10 and flow pipes 115 will be described with reference to FIGS. 1 and 2. FIG. 1 is a longitudinal sectional view showing a fuel cell stack 200 according to an embodiment of the present disclosure. FIG. 2 is a cross-sectional view taken along line H1-H2 of the fuel cell stack 200 in FIG. 1.

The unit cell 10 is configured to receive fuel reformed from a fuel converter (not shown) so as to produce electricity through an oxidation reaction. As shown in FIGS. 1 and 2, the unit cell 10 is formed in a tubular shape. In the tubular unit cell 10, an anode, an electrolyte layer and a cathode are laminated radially from a central axis thereof. The structure of the tubular unit cell 10 is configured for fuel and oxidant to react to generate electrical energy, which electrical current can then be carried away from the unit cell 10 by an electrical wire or other suitable device. The unit cell 10 is formed as an anode-supported unit cell or cathode-supported unit cell as occasion demands. In this embodiment, the unit cell 10 is an anode-supported unit in which an anode is formed in the inside thereof. This is provided for convenience of description and experiment, and the present disclosure is not limited to the anode-supported unit. The bottom end of the unit cell 10 is closed. Meanwhile, detailed descriptions of the configuration and operation of the unit cell 10, which would be evident to one of skill in the art informed by the present disclosure, will be omitted for convenience.

Each of the flow pipes 115 is formed with a cylindrical member having a diameter smaller than the inside diameter of the unit cell 10. The flow pipe 115 is generally formed of a steel material so as to maintain durability at a high temperature of about 800° C. at which a solid oxide fuel cell (SOFC) operates. At least one flow pipe 115 may be inserted into the inside of each of the unit cells 10. Both ends of the flow pipe 115 are opened. A flow path along which gas and/or fluid can flow may be formed by maintaining a predetermined interval between the flow pipes 115 and the unit cells 10. In this instance, an upper end of the flow pipe 115 is fluidly connected to a first fuel chamber R1 which will be described later so that during operation of the SOFC the fluid can flow between the flow pipe 115 and the first fuel chamber R1. An upper end of the unit cell 10 is fluidly connected to a second fuel chamber R2 which will be described later so that during operation of the SOFC the fluid can flow between the unit cell 10 and the second fuel chamber R2. Also illustrated in FIG. 1 is a third separator plate 223 and a fourth separator plate 224. Both the third separator plate 223 and the fourth separator plate 224 contact a plate 231 having one or more collection holes 233 formed therein.

The first and second fuel chambers R1 and R2 will be described with reference to FIGS. 1 and 2. As described above, the unit cell 10 is configured to receive the fuel containing hydrogen. The hydrogen is a main element of an oxidation reaction that produces electrons for current flow. In this instance, the first fuel chamber R1 is positioned at an uppermost end of the fuel cell stack 200. The first fuel chamber R1 includes a space in which the fuel is received through a fuel supply pipe 211a from a fuel supply device such as a fuel converter (not shown). The flow pipes 115 are fluidly connected to a first separation plate 221 at the lower end of the first fuel chamber R1 so that during operation of the fuel cell stack 200 the fluid can flow through the first separation plate 221 between the flow pipes 115 and the first fuel chamber R1. The fuel supplied to the first fuel chamber R1 is distributed and then flows through each of the plurality of flow pipes 115.

The second fuel chamber R2 is formed to constitute one layer below the first fuel chamber R1. The first and second chambers R1 and R2 are spatially separated from each other by the first separation plate 221. The second fuel chamber R2 is connected to the upper ends of the unit cells 10 so that the fluid can flow between the second chamber R2 and the unit cells 10. Thus, during operation the unreacted fuel flows in the second fuel chamber R2 from the unit cells 10. The second fuel chamber R2 has a fuel discharge pipe 211b through which the unreacted fuel is discharged.

That is, during operation of the fuel cell stack 200 the fuel containing hydrogen as a main element first flows in the first fuel chamber R1 through the fuel supply pipe 211a and then flows in the upper end of each of the flow pipes 115. The fuel flowing in each of the flow pipes 115 undergoes an oxidation reaction while rising along a flow path between the flow pipe 115 and the inner circumferential surface of the unit cell 10. After the oxidation reaction is finished, the unreacted fuel flows in the second fuel chamber R2 from the upper ends of the unit cells 10 and then is discharged through the fuel discharge pipe 211b.

Figure 3:
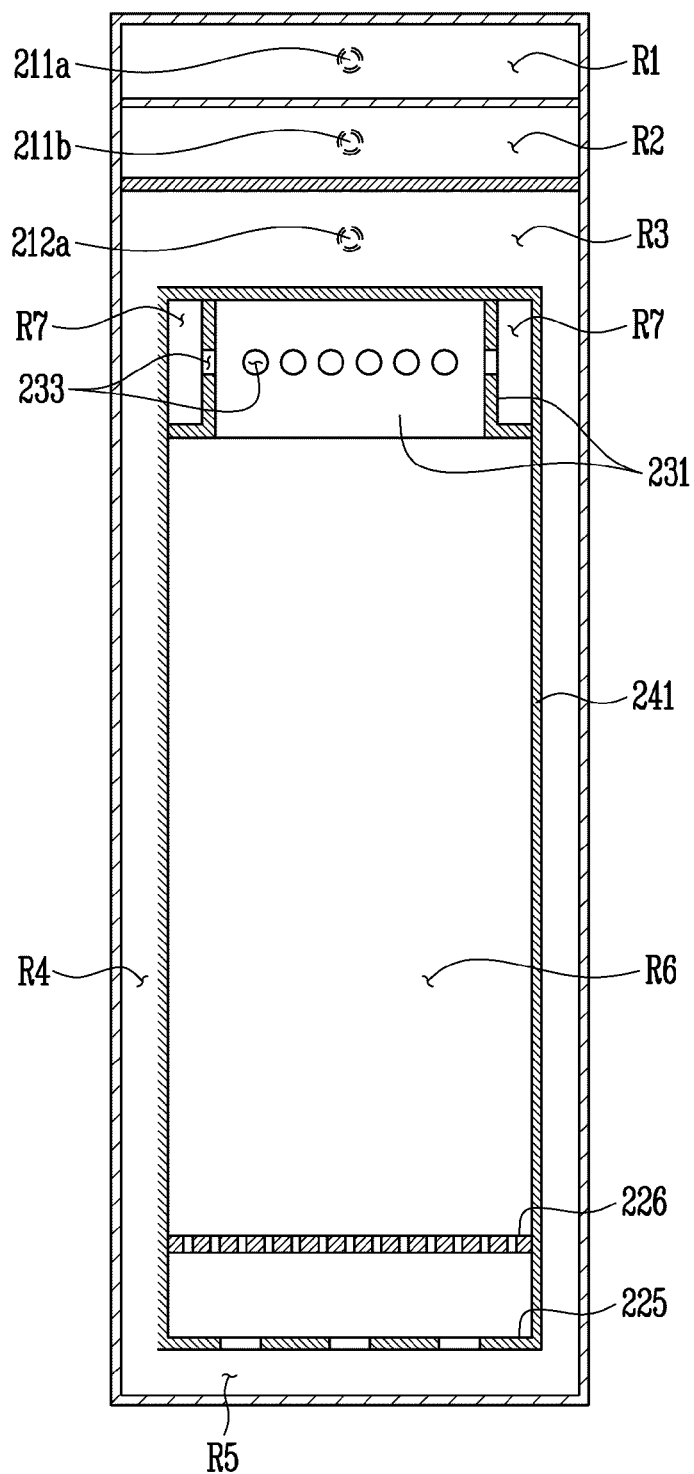
FIG. 3 is a longitudinal sectional view roughly showing a fuel cell stack in FIG. 1.
Figure 4:
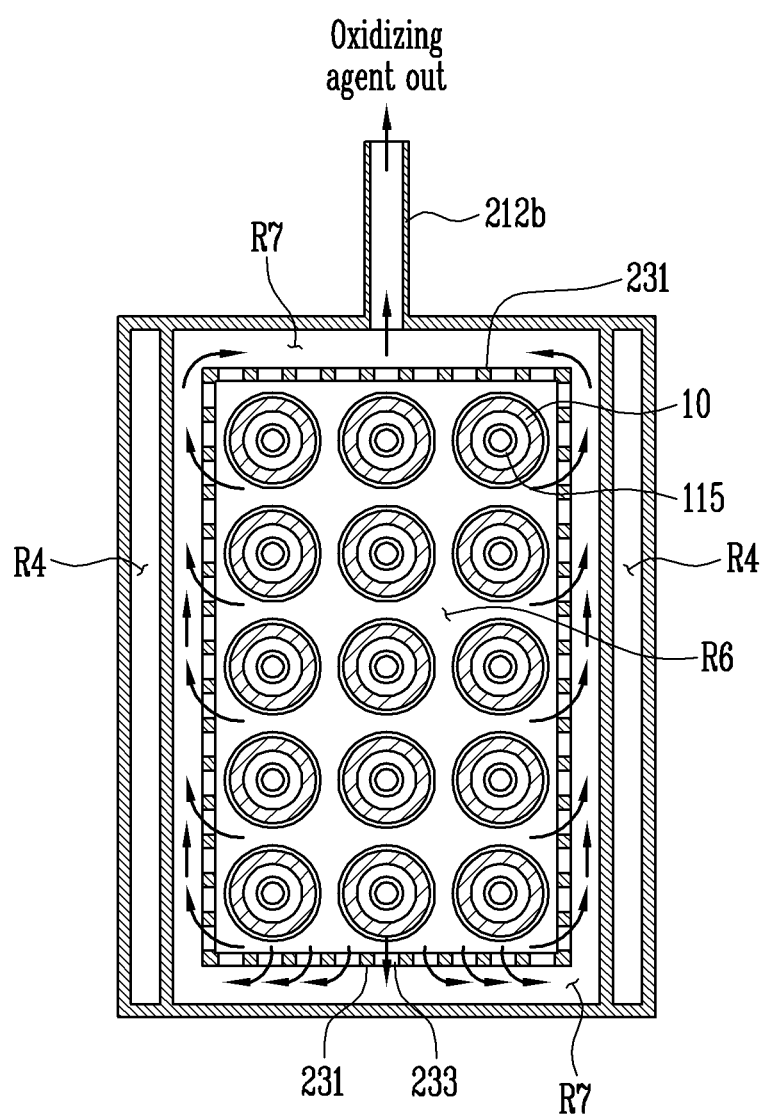
FIG. 4 is a cross-sectional view taken along line H3-H4 of the fuel cell stack in FIG. 1.

A configuration related to the supply and discharge of an oxidizing agent, including first and second oxidizing agent chambers R3 and R6, will be described with reference to FIGS. 2 to 4. FIG. 2 is a cross-sectional view taken along line H1-H2 of the fuel cell stack 200 in FIG. 1. FIG. 3 is a longitudinal sectional view roughly showing a fuel cell stack 200 in FIG. 1. FIG. 4 is a cross-sectional view taken along line H3-H4 of the fuel cell stack 200 in FIG. 1. In FIG. 3, piping equipment related to the unit cell 10 and the fuel will be omitted for convenience of illustration.

The first oxidizing agent chamber R3 is positioned below the second fuel chamber R2 as shown in FIG. 1. The first oxidizing agent chamber R3 and the second fuel chamber R2 are spatially separated from each other by a second separation plate 222. The first oxidizing agent chamber R3 includes a space in which an external oxidizing agent initially flows from an oxidizing agent supply pipe 212a. During operation of the fuel cell 200 air or pure oxygen ($O_2$) may be supplied as the oxidizing agent. In some embodiments, another gas containing oxygen may be supplied as the oxidizing agent. The oxidizing agent flowing in the first oxidizing agent chamber R3 flows in oxidizing agent flow paths R4 respectively provided at sides adjacent to one surface of the first oxidizing agent chamber R3, to which the oxidizing agent supply pipe 212a is provided. As can be seen on the cross-sectional view of FIG. 2, the oxidizing agent flow paths R4 are formed as predetermined spaces at both sides of the second separation plate 222. The oxidizing agent flow path R4 may be formed from a side portion of the first oxidizing agent chamber R3 to the lowermost end of the fuel cell stack 200. The oxidizing agent flow paths R4 are fluidly connected to a lower chamber R5 which will be described later.

Meanwhile, the oxidizing agent flow path R4 may also be formed at the opposite side of the one surface of the first oxidizing agent chamber R3, to which the oxidizing agent supply pipe 212a is provided. However, as shown in FIG. 2, the oxidizing agent flow path R4 is preferably formed at only both the sides of the one surface of the first oxidizing agent chamber R3, to which the oxidizing agent supply pipe 212a is provided, for uniform supply of the oxidizing agent.

A plate 241 configured for spatially separating the oxidizing agent flow path R4 and the second oxidizing agent chamber R6, which will be described later, is formed using a heat conductive material such as general steel constituting a housing of the fuel cell stack. That is, the plate 241 is preferably formed so that during operation heat generated in the inside of the fuel cell stack 200 can be conducted into the oxidizing agent flow paths R4 without using a separate insulation member. The oxidizing agent supplied through the oxidizing agent flow paths R4 is preheated using heat generated in operation of the fuel cell stack 200.

The lower chamber R5 is positioned at the lowermost end of the fuel cell stack 200 so that during operation of the fuel cell stack 200 the oxidizing agent conducted through the oxidizing agent flow paths R4 may be temporarily housed. A distribution portion 225 and 226 is provided over the lower chamber R5. The distribution portion 225 and 226 may be formed having at least one plate having holes formed therein. In this embodiment, the distribution portion 225 and 226 is formed as a two-step plate. The lower distribution plate 225 may be configured to distribute flow of the oxidizing agent rising from the lower chamber R5. During operation of the fuel cell stack 200, the upper distribution plate 226 functions to control a fine flow of the oxidizing agent according to arrangement of the unit cells. The lower and upper distribution plates 225 and 226 are configured to distribute the flow of the oxidizing agent according to the number, size and position of holes. That is, the lower distribution plate 225 has a plurality of holes which have a diameter larger than that of the upper distribution plate 226 and are smaller in number than those of the upper distribution plate 226. Thus, the upper distribution plate 226 has a plurality of holes which have a diameter relatively smaller than that of the lower distribution plate 225 and are greater in number than those of the lower distribution plate 225. In this manner, the upper distribution plate 226 is configured to control flow of the oxidizing agent.

The second oxidizing agent chamber R6 includes a space surrounding the outer surfaces of the unit cells 10. During operation of the fuel cell stack 200 the oxidizing agent passing through the distribution portion 225 and 226 flows in the second oxidizing agent chamber R6. The oxidizing agent undergoes a reduction reaction with the outer surface of the unit cell 10, (for example, the cathode in this embodiment) to generate oxygen ions while rising from the lower end of the second oxidizing agent chamber R6.

The oxidizing agent rising up to the upper end of the second oxidizing agent chamber R6 then moves to an oxidizing agent collection chamber R7. The oxidizing agent collection chamber R7 is a space formed along a circumference of the uppermost end of the second oxidizing agent chamber R6. The oxidizing agent collection chamber R7 and the second oxidizing agent chamber R6 are spatially separated from each other by the plate 231 having a plurality of collection holes 233 formed therein. The oxidizing agent collection chamber R7 is fluidly connected to an oxidizing agent discharge pipe 212b so that during operation of the fuel cell stack 200 the collected oxidizing agent is discharged to the outside through the oxidizing agent discharge pipe 212b. The collection holes 233 are used maximizing performance of the fuel cell stack by maintaining the flow of the oxidizing agent, uniformly formed in the second oxidizing agent chamber R6. To this end, the size of the collection hole 233 and the number of holes formed in each surface of the oxidizing agent collection chamber R7 may be varied. That is, the oxidizing agent rises up to the uppermost end of the second oxidizing agent chamber R6 while being distributed as uniformly as possible in the inside of the second oxidizing agent chamber R6. Then, the oxidizing agent moves to the inside of the oxidizing agent collection chamber R7 through the collection holes 233, and moves up to the oxidizing agent discharge pipe 212b along the oxidizing agent collection chamber R7. As a result, the oxidizing agent is discharged to the outside of the fuel cell stack.

Figure 5:
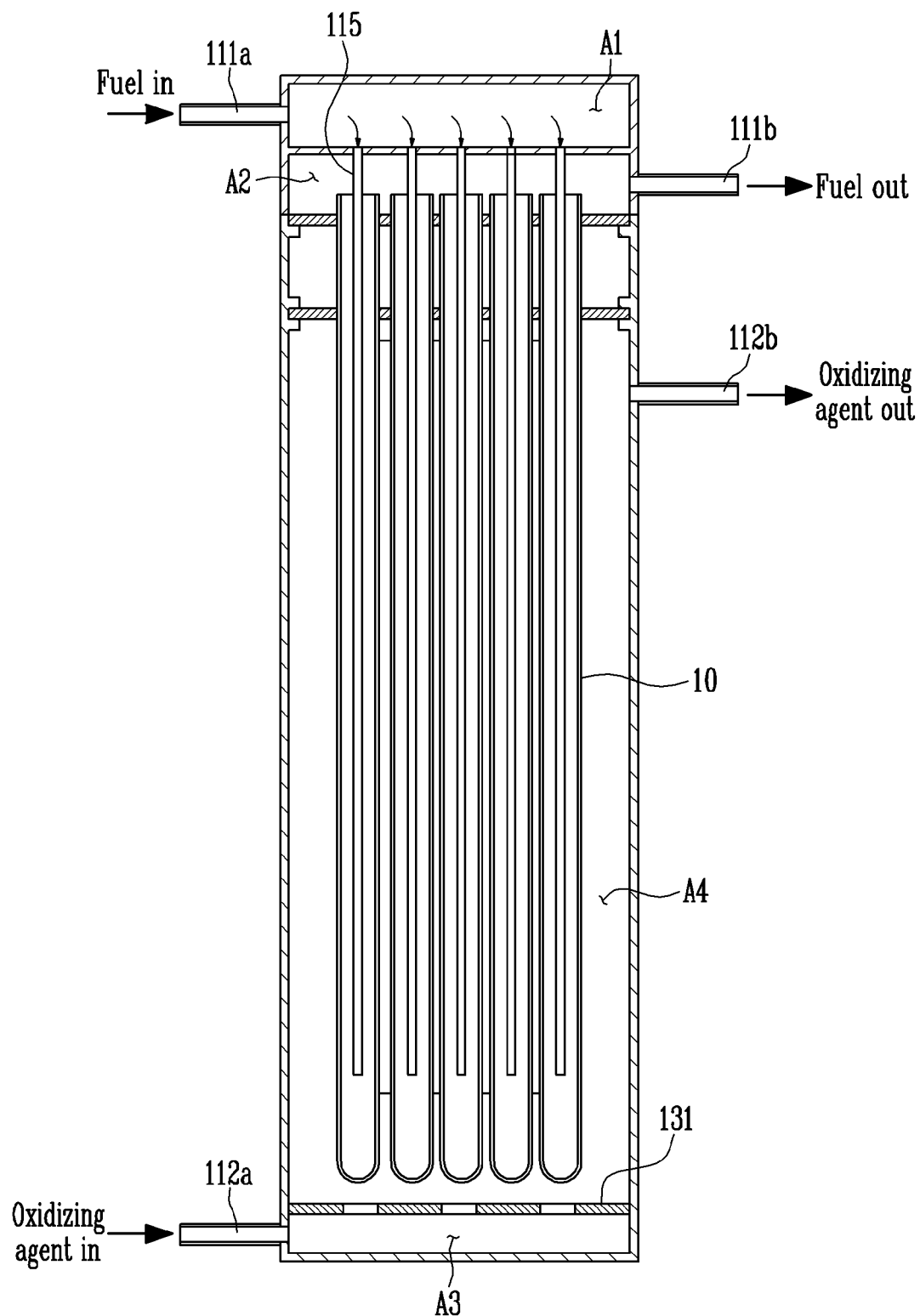
FIG. 5 is a longitudinal sectional view showing a fuel cell stack according to a comparative example.

A comparative example will be described with reference to FIG. 5. FIG. 5 is a longitudinal sectional view showing a fuel cell stack 100 according to a comparative example. In the fuel cell stack 100, a fuel supply pipe 111a is formed on one surface of the uppermost end of the fuel cell stack 100, and a fuel discharge pipe 111b is formed on a surface opposite to the surface on which the fuel supply pipe 111a is formed. An oxidizing agent supply pipe 112a is formed at a lowermost end of the fuel cell stack 100, and an oxidizing agent passing through the inside of the fuel cell stack 100 is discharged to the outside through the oxidizing agent discharge pipe 112b spaced apart from the oxidizing agent supply pipe 112a. That is, in the comparative example, equipment for the supply and discharge of fuel and the oxidizing agent are scattered at the respective portions of the fuel cell stack 100, and therefore, equipment such as supply pipes configured for transporting the fuel and the oxidizing agent may be more complex than the structure of the fuel cell stack 200 discussed above. Indeed, during operation of the fuel cell stack 200 shown in FIG. 1, the oxidizing agent supply pipe 212a and the oxidizing agent discharge pipe 212b, which have a large flow rate, can be freely provided to the same surface as the fuel supply pipe 211a and the fuel discharge pipe 211b, and the positions of the oxidizing agent supply pipe 212a and the oxidizing agent discharge pipe 212b can be provided adjacent to those of the fuel supply pipe 211a and the fuel discharge pipe 211b. In a case where a fuel cell module having similar equipment related to the supply and discharge of the fuel and the oxidizing agent is formed using a plurality of fuel cell stacks 200 configured as described above, it is possible to obtain structural advantages. Further, the oxidizing agent supply pipe 211a and the oxidizing agent discharge pipe 211b can be variously provided according to the configuration of the fuel cell stack. FIG. 5 also illustrates a first fuel chamber A1, a second fuel chamber A2, a first oxidizing chamber A3, and a second oxidizing chamber A4.

Figure 6:
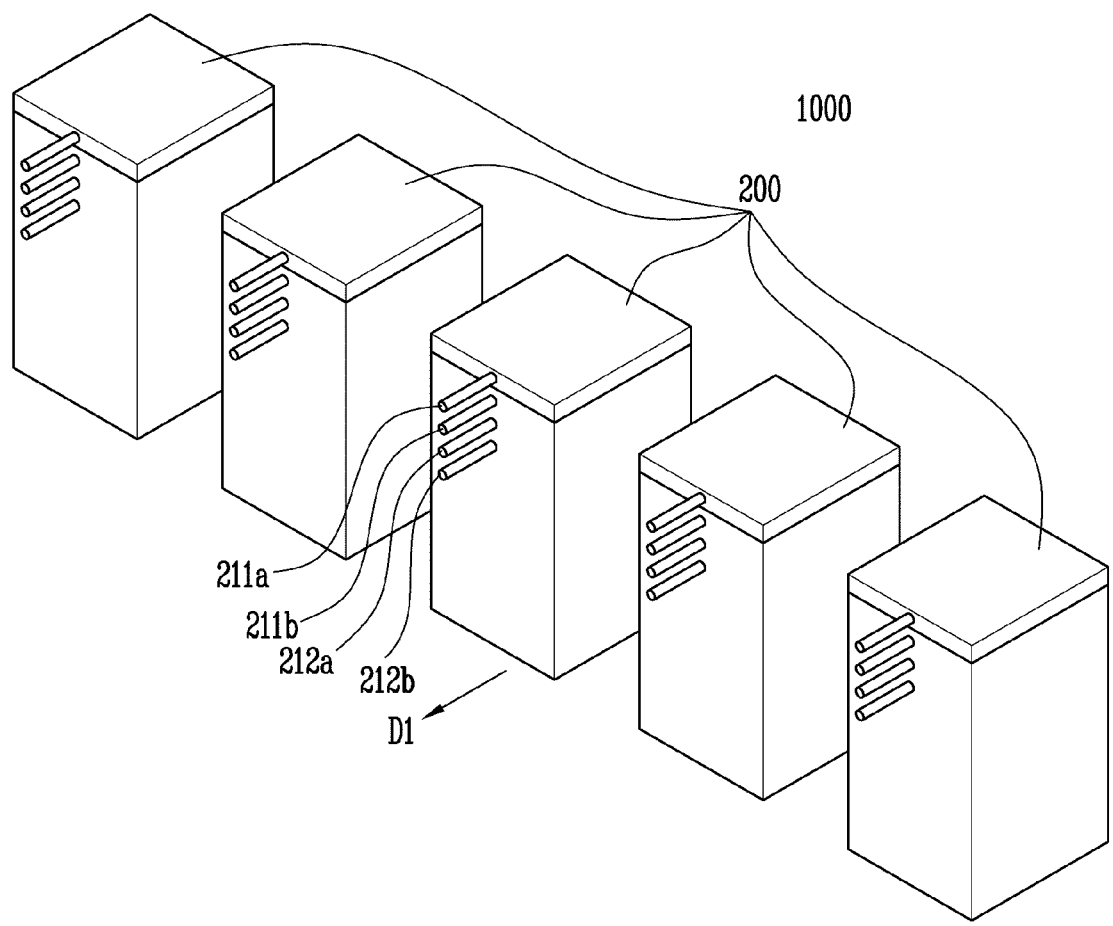
FIG. 6 is a schematic view showing a fuel cell module according to an embodiment of the present disclosure.

FIG. 6 shows a fuel cell module 1000 according to an embodiment of the present disclosure. In a case where the fuel supply pipe 211a, the fuel discharge pipe 211b, the oxidizing agent supply pipe 212a and the oxidizing agent discharge pipe 212b are provided together on a common surface of the fuel cell stack 200 as described above, each of the fuel cell stacks 200 can be arranged so that the fuel supply pipe 211a, the fuel discharge pipe 211b, the oxidizing agent supply pipe 212a and the oxidizing agent discharge pipe 212b face the same direction D1 as shown in FIG. 6. In this case, the equipment such as pipes configured for supplying the fuel and the oxidizing agent are simplified, so that it is possible to obtain spatial and to save resources injected in the pipes and the like.

While the present invention has been described in connection with certain exemplary embodiments, it will be appreciated by those skilled in the art that various modifications and changes may be made without departing from the scope of the present disclosure. It will also be appreciated by those of skill in the art that parts mixed with one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel cell stack, comprising:
    an oxidizing agent supply pipe configured to allow an oxidizing agent to flow from outside the fuel cell stack into a first oxidizing agent chamber;
    a second oxidizing agent chamber configured to perform a reduction reaction on the oxidizing agent; and
    an oxidizing agent flow path fluidly connecting the first and second oxidizing agent chambers, the oxidizing agent flow path having an opening to an outside of the second oxidizing agent chamber, the opening positioned and configured to conduct heat away from the second oxidizing agent chamber;
    a first fuel chamber having a fuel supply pipe through which a fuel is supplied;
    a second fuel chamber fluidly connected to a fuel discharge pipe through which unreacted fuel is discharged to an outside thereof;
    a flow pipe having one end fluidly connected to the first fuel chamber and the other end opened; and
    a unit cell surrounding the flow pipe to form a flow path between the unit cell and the flow pipe, the unit cell having one end sealed and the other end fluidly connected to the second fuel chamber,
    wherein the fuel supply pipe, the fuel discharge pipe, the oxidizing agent supply pipe and an oxidizing agent discharge pipe are provided in the same side.

2. The fuel cell stack of claim 1, wherein the oxidizing agent flow path is positioned adjacent to the oxidizing agent supply pipe.

3. The fuel cell stack of claim 1, wherein a heat conductive member is positioned between the oxidizing agent flow path and the second oxidizing agent chamber.

4. The fuel cell stack of claim 1, further comprising a lower chamber fluidly connecting the oxidizing agent flow path and the second oxidizing agent chamber.

5. The fuel cell stack of claim 4, wherein a distribution portion is positioned over the lower chamber, the distribution portion configured for uniformly supplying the oxidizing agent from the lower chamber into the second oxidizing agent chamber.

6. The fuel cell stack of claim 5, wherein the distribution portion is formed with a two-step plate having a plurality of holes formed therein.

7. The fuel cell stack of claim 1, further comprising an oxidizing agent collection chamber fluidly connected to each of the second oxidizing agent chamber and the oxidizing agent discharge pipe.

8. The fuel cell stack of claim 7, further comprising a plate having a plurality of collection holes fluidly connecting the oxidizing agent collection chamber and the second oxidizing agent chamber.

9. The fuel cell stack of claim 8, wherein the oxidizing agent collection chamber is positioned at an upper end of the second oxidizing agent chamber.

10. The fuel cell stack of claim 8, wherein the plurality of collection holes is formed at a circumference of the upper end of the second oxidizing agent chamber.

* * * * *

UNITED STATES PATENT AND TRADEMARK OFFICE
CERTIFICATE OF CORRECTION

PATENT NO. : 9,005,836 B2  
APPLICATION NO. : 13/548617  
DATED : April 14, 2015  
INVENTOR(S) : Sang-Jun Kong It is certified that error appears in the above-identified patent and that said Letters Patent is hereby corrected as shown below:

Claims
In column 8 at line 60, In Claim 10, change "claim 8" to --claim 9--.

Signed and Sealed this
Ninth Day of February, 2016

Michelle K. Lee
*Director of the United States Patent and Trademark Office*